(12) United States Patent
Nakahara et al.

(10) Patent No.: US 7,732,958 B2
(45) Date of Patent: Jun. 8, 2010

(54) TURBOGENERATOR

(75) Inventors: Akihito Nakahara, Hitachi (JP);
Kazuhiko Takahashi, Hitachi (JP);
Kazumasa Ide, Hitachiohta (JP);
Mamoru Kimura, Hitachi (JP)

(73) Assignee: Hitachi, Ltd., Tokyo (JP)

(*) Notice: Subject to any disclaimer, the term of this patent is extended or adjusted under 35 U.S.C. 154(b) by 51 days.

(21) Appl. No.: 11/206,767

(22) Filed: Aug. 19, 2005

(65) Prior Publication Data
US 2006/0138881 A1 Jun. 29, 2006

(30) Foreign Application Priority Data
Dec. 24, 2004 (JP) .............. 2004-372481

(51) Int. Cl.
*H02K 19/36* (2006.01)
*H02K 19/38* (2006.01)

(52) U.S. Cl. ............... 310/68 D; 310/112; 310/114; 310/156.48

(58) Field of Classification Search .......... 310/90.5, 310/68 D, 112, 114, 52–64, 156.48, 156.49; 290/52
See application file for complete search history.

(56) References Cited

U.S. PATENT DOCUMENTS

| 2,189,524 A | * | 2/1940 | Randolph et al. | 310/156.49 |
|---|---|---|---|---|
| 2,673,302 A | * | 3/1954 | Gynt | 310/156.49 |
| 3,052,958 A | * | 9/1962 | Anderson | 29/598 |
| 3,821,633 A | | 6/1974 | Neasham et al. | |
| 3,863,137 A | | 1/1975 | Mishima et al. | |
| 4,728,840 A | * | 3/1988 | Newhouse | 310/113 |
| 5,371,426 A | * | 12/1994 | Nagate et al. | 310/156.49 |
| 5,587,616 A | * | 12/1996 | Johnsen | 310/68 D |
| 5,994,804 A | * | 11/1999 | Grennan et al. | 310/60 R |
| 2004/0027077 A1 | | 2/2004 | Xu et al. | |
| 2004/0056487 A1 | | 3/2004 | Sarlioqlu et al. | |

FOREIGN PATENT DOCUMENTS

JP 2003-515308 4/2003
WO 2004/055960 A1 7/2004

* cited by examiner

*Primary Examiner*—Quyen Leung
*Assistant Examiner*—Alex W Mok
(74) *Attorney, Agent, or Firm*—Mattingly & Malur, P.C.

(57) ABSTRACT

A rotating shaft is required to have an overhang for the mounting of a generator for an AC-exciter, the shaft length being increased correspondingly. The overhang may become the cause of generating shaft vibrations. A turbogenerator has a rotor over which a field winding is disposed, a coupling co-cut from a rotor shaft, an AC exciter for supplying a DC current to the field winding through a rectifier, and a generator for the AC-exciter, the generator including a permanent magnet as a field generator and supplying a DC current to a field winding of the AC exciter through the rectifier. The AC exciter and the generator are disposed over the rotor shaft. The rotor is rotated through engagement between a turbine and the coupling. The generator for the AC-exciter is mounted in a position on the side nearer to the turbine than a stator of the turbogenerator.

7 Claims, 7 Drawing Sheets

TURBOGENERATOR

BACKGROUND OF THE INVENTION

1. Field of the Invention

The present invention relates to a turbogenerator including a brushless exciter.

2. Description of the Related Art

In a known structure of a turbogenerator including a brushless exciter, an alternating-current (AC) exciter and a sub-exciter are mounted in an end region on the side opposite to a turbine, as disclosed in Patent Document 1; JP,A 2003-515308.

SUMMARY OF THE INVENTION

The above-mentioned known structure is disadvantageous in that a rotating shaft is required to have an overhang for mounting of the sub-exciter and the shaft length is increased correspondingly. The overhang may become the cause of generating shaft vibrations.

According to one aspect of the present invention, a turbogenerator comprises a rotor over which a field winding is disposed, a generator for alternating-current excitation including a permanent magnet disposed over the rotor and generating a current with a magnetic field produced by the permanent magnet, an exciter for supplying a current to the field winding of the rotor based on the current generated by a sub-exciter, wherein the generator for alternating-current excitation is disposed on the side nearer to the turbine than a stator.

With the present invention, it is possible to shorten the length of an overhang provided in an end region of a turbogenerator, to reduce the size of the turbogenerator, and to suppress shaft vibrations.

DESCRIPTION OF THE PREFERRED EMBODIMENTS

Figures 11, 12:
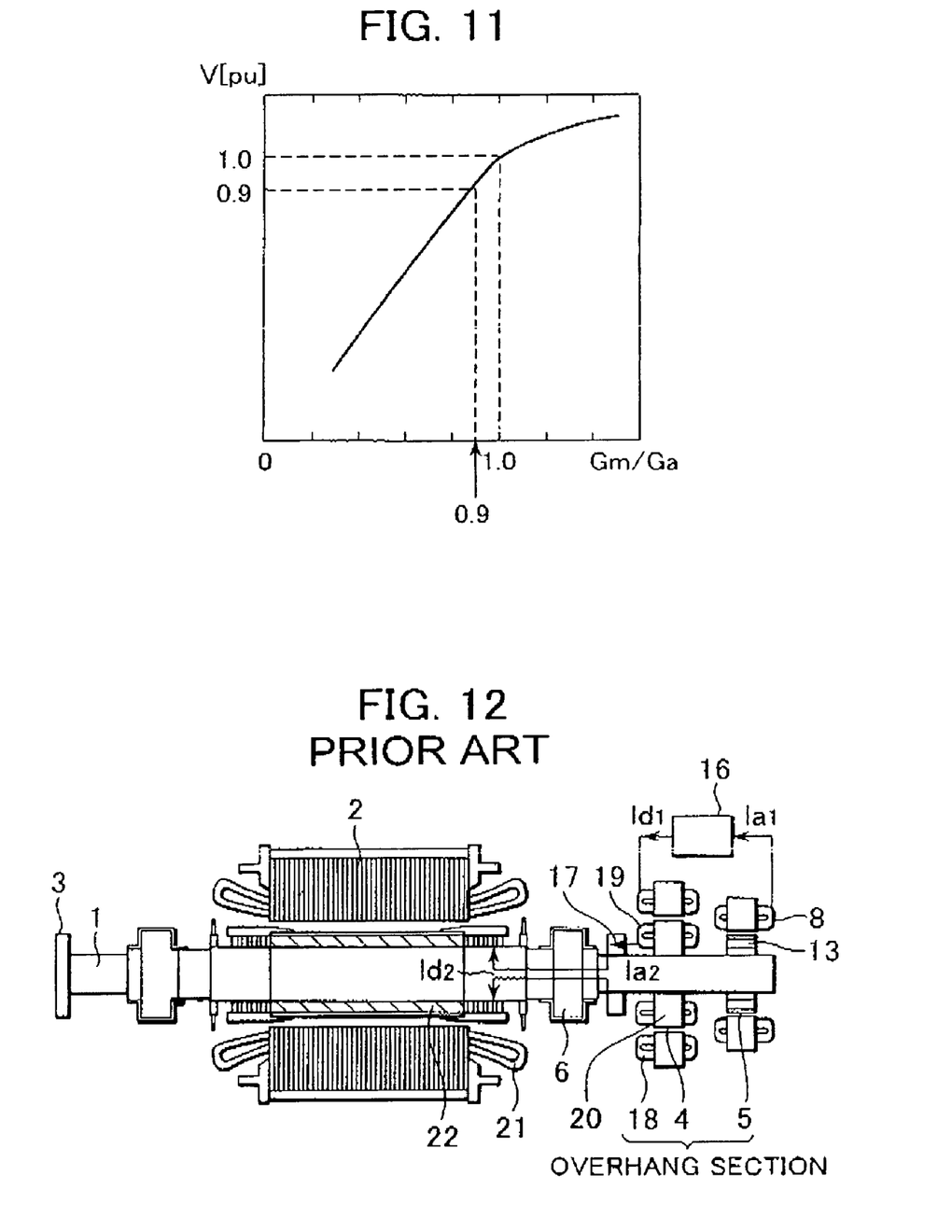
FIG. 11 is a graph showing the relationship between a ratio of a magnet thickness to the air gap and an induced voltage.
FIG. 12 illustrates a known turbogenerator including a brushless exciter.
Figure 13:
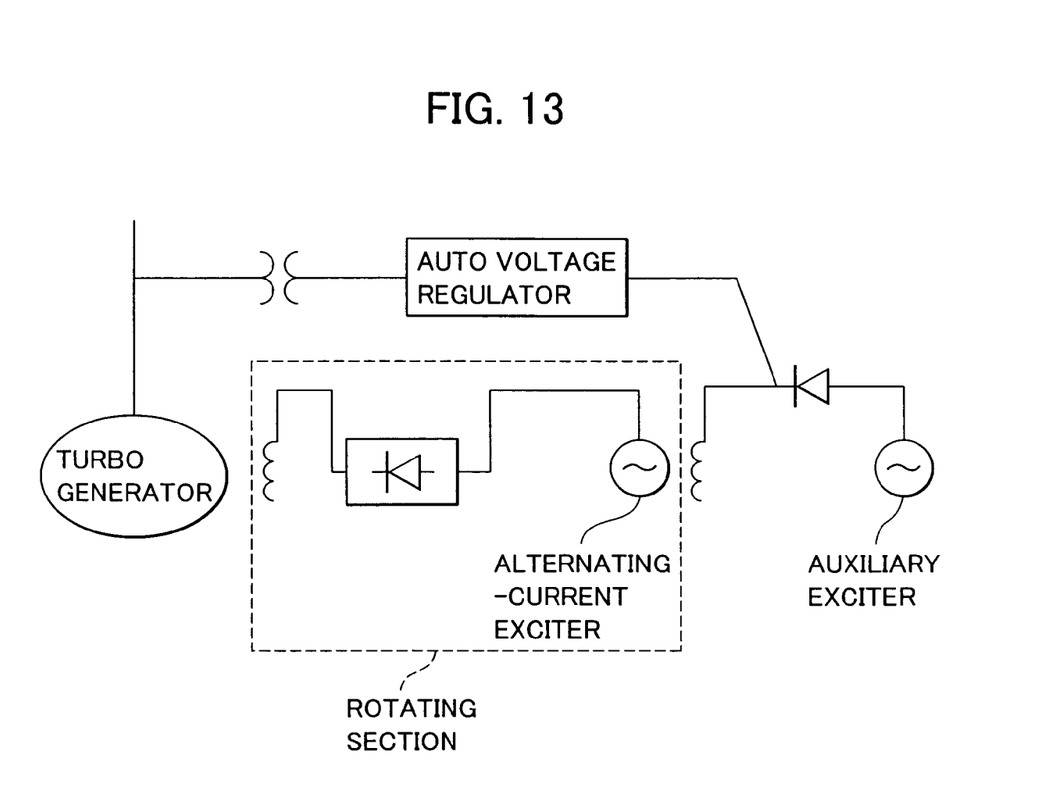
FIG. 13 is a circuit diagram showing a manner of brushless excitation.

For easier understanding of the advantages of the present invention, FIG. 12 illustrates, as a comparative example, one example of a known turbogenerator including a brushless exciter. The turbogenerator has an alternating-current (AC) exciter 4 and a sub-exciter 5 both mounted in an end region of a rotor of the turbogenerator. The sub-exciter 5 has a permanent magnet 13 as a rotor magnet pole, and the permanent magnet 13 forms a magnetic field perpendicular to an armature winding 8. When the magnetic field is rotated with the rotation of a rotating shaft 1, an AC current $I_{a1}$ is induced in the armature winding 8 based on the electromagnetic induction action. An auto voltage regulator 16 having the rectifying function detects a generator voltage, converts the AC current $I_{a1}$ to a DC current $I_{d1}$, and supplies the DC current $I_{d1}$ to a field winding 18 of the AC exciter 4. An armature winding 19 of the AC exciter 4 is mounted over a rotor 20 of the AC exciter, and an AC current $I_{a2}$ is induced in the armature winding 19 with the rotation of the rotating shaft 1. The induced AC current $I_{a2}$ is converted to a DC current $I_{d2}$ through a rotating rectifier 17 and is supplied to a field winding 21 of the turbogenerator. Then, with the rotation of the rotating shaft 1, an AC current is induced in an armature winding 22 of the turbogenerator, whereby electric power can be supplied to the outside. FIG. 13 shows one example of a circuit diagram showing a manner of brushless excitation in the comparative example.

Embodiments of the present invention will be described below with reference to the drawings.

First Embodiment

Figure 1:
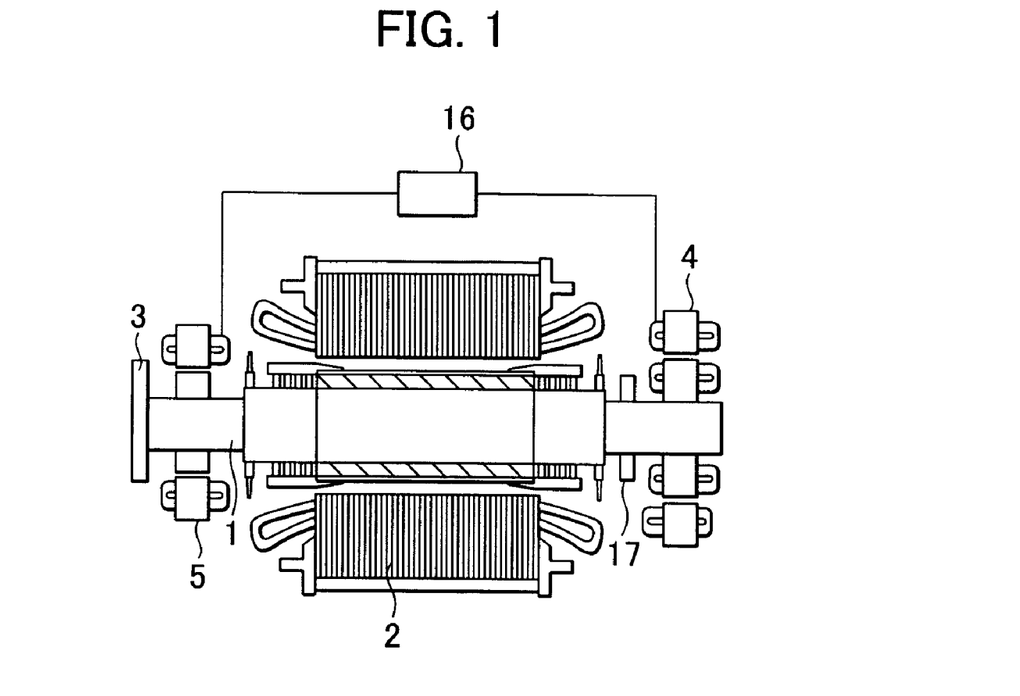
FIG. 1 illustrates a first embodiment of the present invention.

FIG. 1 illustrates a first embodiment of the present invention. A rotating shaft 1 is connected to a turbine through a coupling 3. A sub-exciter 5 is mounted over the rotating shaft 1 on the side nearer to the turbine than a stator 2. An alternating-current (AC) exciter 4 is mounted over the rotating shaft 1 in its end region on the side opposite to the turbine.

By thus mounting the sub-exciter on the side near the turbine, the length of an overhang at the shaft end can be reduced in amount that has been required for installation of the permanent magnet in the related art.

Second Embodiment

Figure 2:
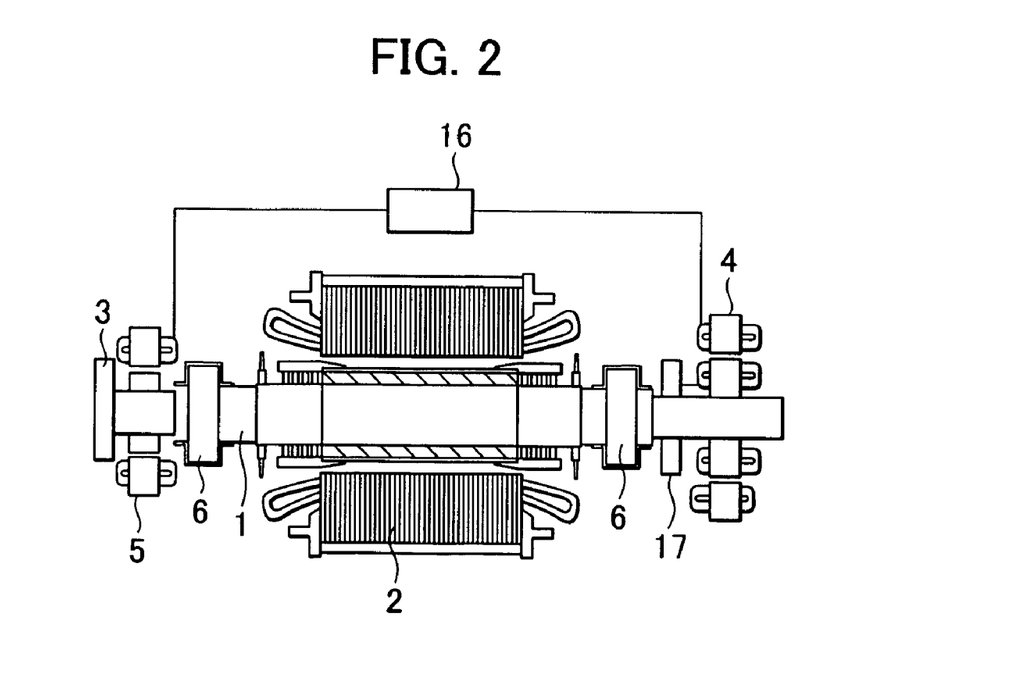
FIG. 2 illustrates a second embodiment of the present invention.

FIG. 2 illustrates a second embodiment of the present invention. The sub-exciter 5 is mounted over the rotating shaft 1 between a turbine-side bearing 6 for supporting the rotating shaft 1 and the coupling 3. With such an arrangement, the length of an overhang required for mounting of the sub-exciter can be reduced.

Third Embodiment

Figure 3:
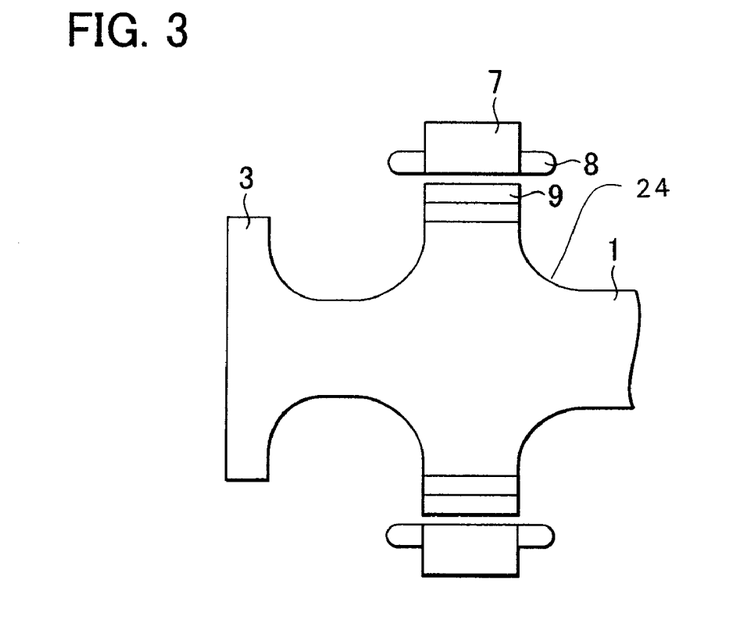
FIG. 3 illustrates a third embodiment of the present invention.

FIG. 3 illustrates a third embodiment of the present invention. In a turbogenerator having a coupling 3 that is co-cut from a rotating shaft 1, when a sub-exciter having a ring-shaped rotor 9 is mounted over the rotating shaft on the side near the turbine by shrink fitting, an inner diameter of the rotor 9 of the sub-exciter requires to be larger than an outer diameter of the coupling 3. To meet such a requirement, as shown in FIG. 3, a pedestal portion 24 having a larger diameter than the coupling 3 is cut from the rotating shaft so that the ring-shaped rotor can be mounted in place by shrink fitting.

Fourth Embodiment

Figure 4:
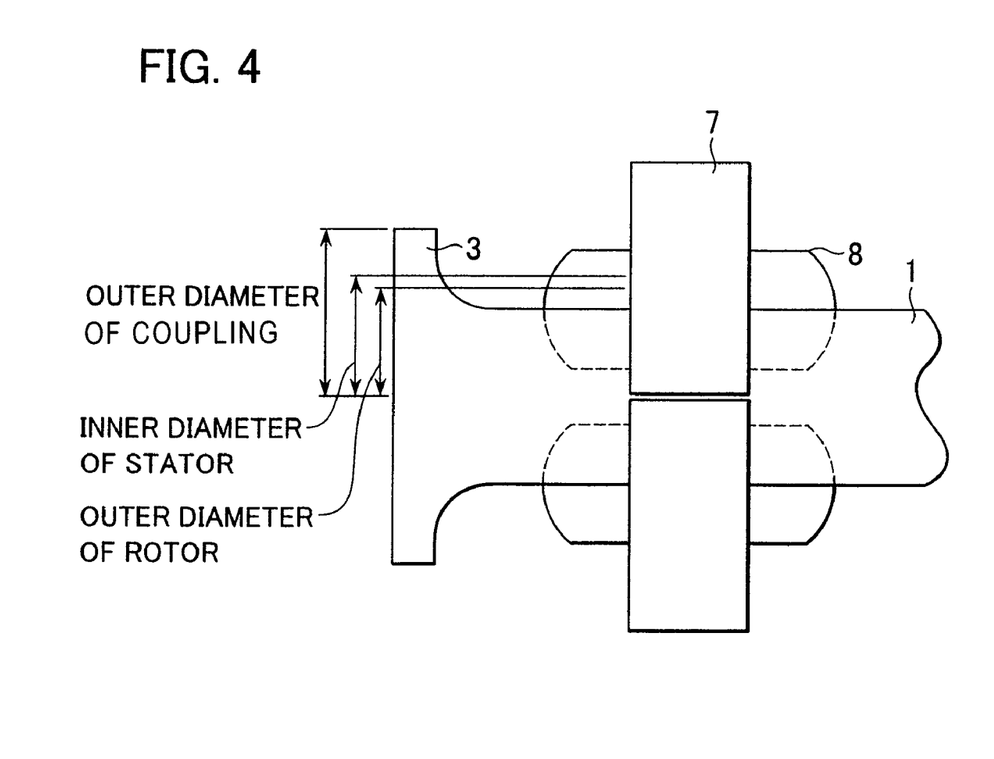
FIG. 4 illustrates a fourth embodiment of the present invention.
Figure 5:
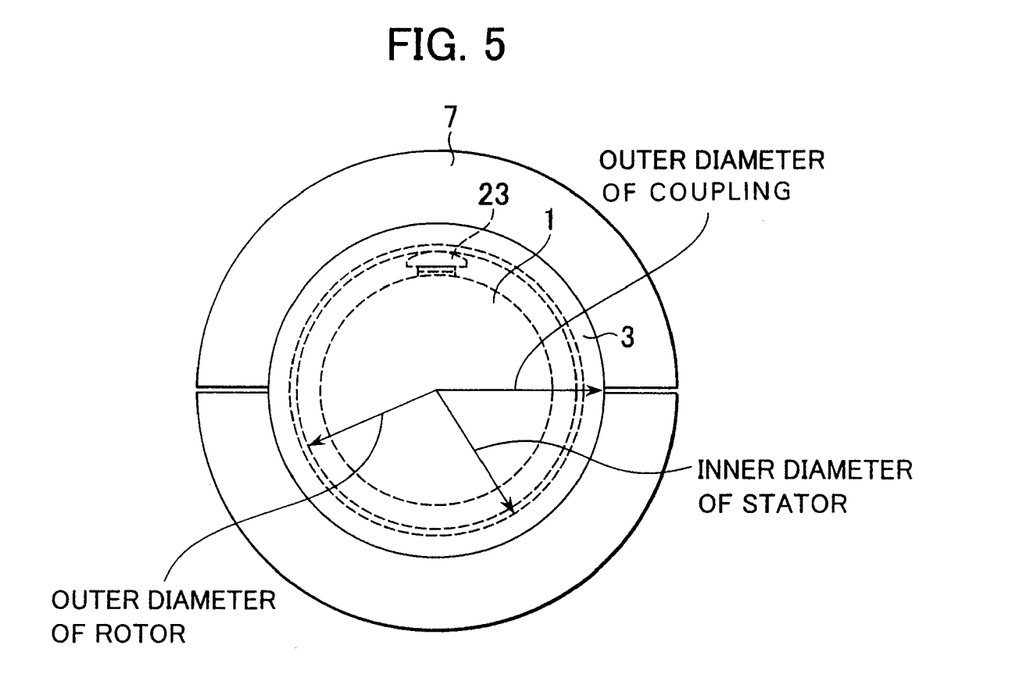
FIG. 5 is an end view looking components in FIG. 4 in the axial direction from the turbine side.

FIGS. 4 and 5 illustrate a fourth embodiment of the present invention. Because the rotor of the sub-exciter is mounted over the rotating shaft of the turbogenerator rotating at a high speed, an enlarged outer diameter increases a centrifugal force.

To avoid such a drawback, as shown in FIGS. 4 and 5, a stator 7 of the sub-exciter 5, including the armature winding 8, is of a structure capable of being split in the circumferential direction and a magnetic pole 23 is directly mounted over the rotating shaft. With such an arrangement, the sub-exciter can be mounted even with the stator 7 having an inner diameter smaller than the outer diameter of the coupling 3. FIG. 4 is a view looking in the radial direction, and FIG. 5 is a view looking in the axial direction from the turbine side.

Fifth Embodiment

Figure 6:
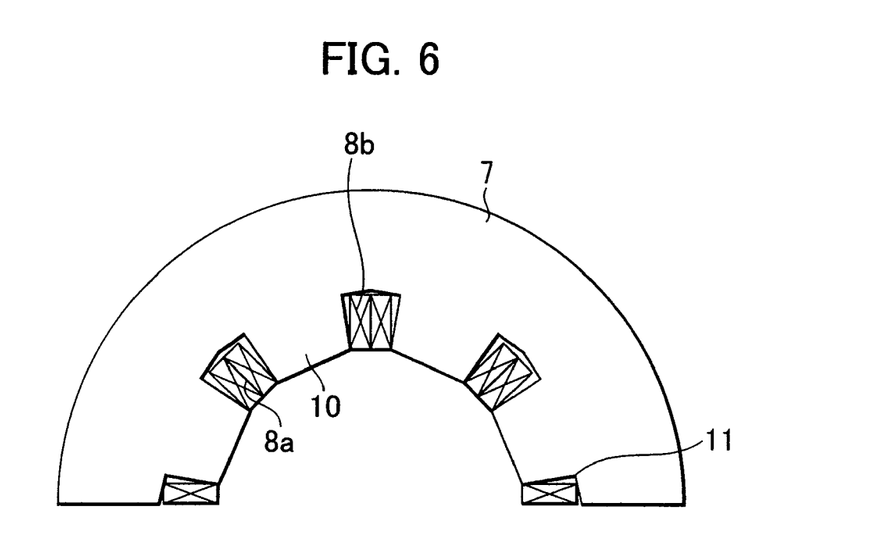
FIG. 6 illustrates a fifth embodiment of the present invention.

FIG. 6 illustrates a fifth embodiment of the present invention. FIG. 6 shows a half of the divided stator in which armature windings 8a and 8b of the sub-exciter are wound over one of teeth 10 (or in halves of slots on both sides of each tooth) formed in a stator 7 of the sub-exciter. Other armature windings accommodated in other slots are also wound in a similarly concentrated manner. With such an arrangement, the stator 7 of the sub-exciter can be split in the circumferential direction at any desired one of slots 11.

Sixth Embodiment

Figure 7:
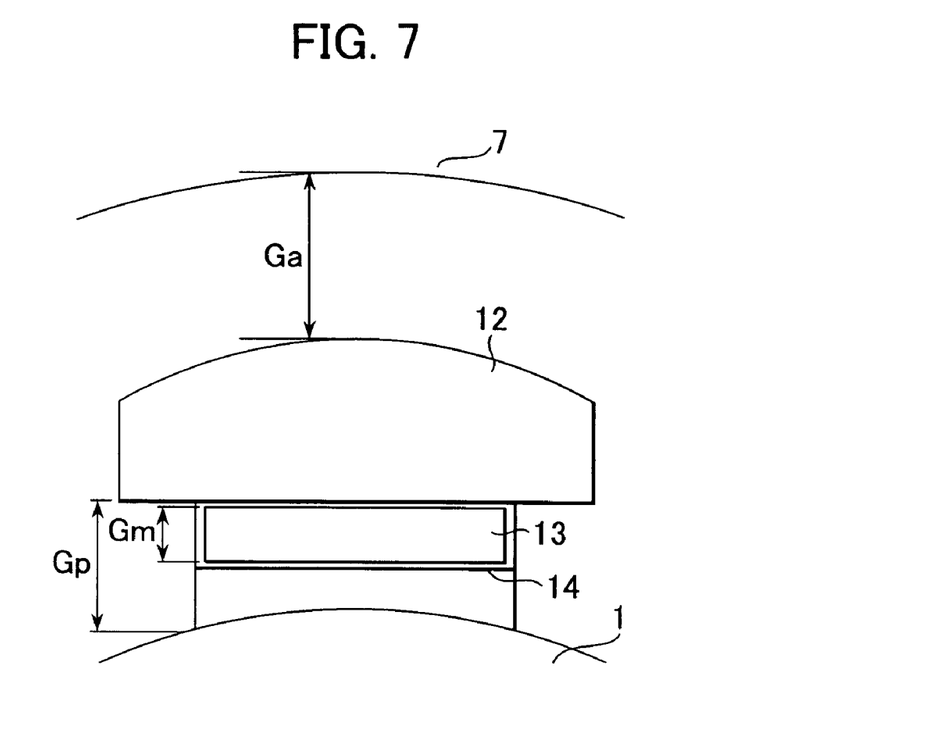
FIG. 7 illustrates a sixth embodiment of the present invention.
Figure 8:
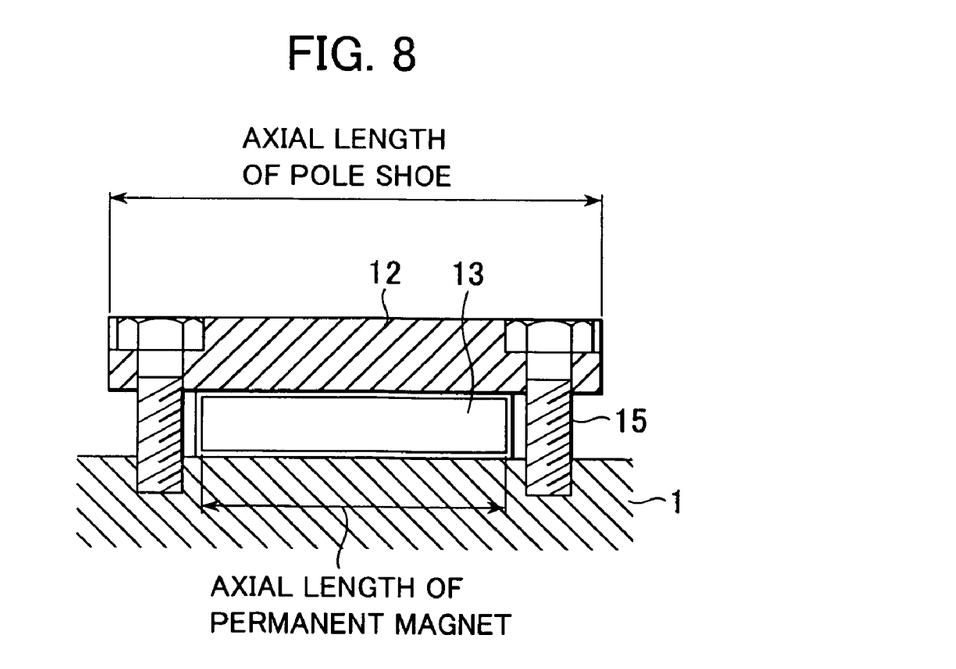
FIG. 8 is a sectional view of components in FIG. 7 taken along the radial direction.

FIGS. 7 and 8 illustrate a sixth embodiment of the present invention. FIG. 7 is an axial sectional view of a magnetic pole of the sub-exciter provided in the turbogenerator of the present invention. The permanent magnet 13 is mounted between the rotating shaft 1 and a pole shoe 12 and is covered with a magnet cover 14 made of a nonmagnetic material so that the permanent magnet 13 is prevented from being dislodged and flying outward. The magnet cover 14 should be nonmagnetic to prevent establishment of a short-circuiting path of magnetic flux from the pole shoe 12 to the rotating shaft 1.

In FIG. 7, a minimum air gap Ga (mm) between the stator 7 and the rotor of the sub-exciter is set not smaller than 5 mm so as to prevent generation of heat in the surface of the pole shoe 12 due to an eddy current losses. Also, a distance Gp (mm) between the pole shoe 12 and the rotating shaft 1 and a thickness Gm (mm) of the permanent magnet 13 satisfy the relationships of $0.9 < Gp/Ga$ and $0.9 < Gm/Ga$. With such settings, the magnetic flux can be prevented from leaking from the pole shoe 12 to the rotating shaft 1.

Figure 9:
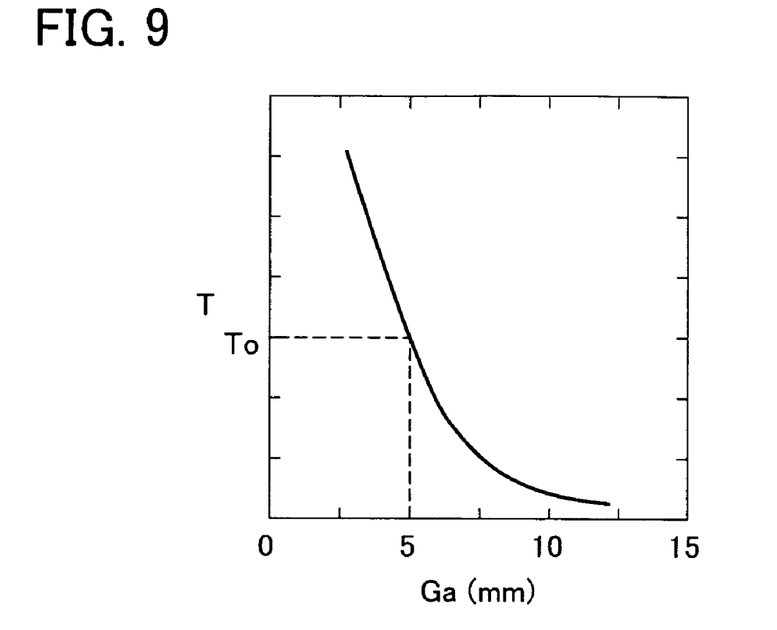
FIG. 9 is a graph showing the relationship between an air gap and a permanent magnet temperature.

FIG. 9 shows an analysis result representing the relationship between the air gap Ga and a permanent magnet temperature T. In FIG. 9, $T_o$ indicates the irreversible thermal demagnetization temperature of a permanent magnet. In the case of a neodymium magnet, for example, the irreversible thermal demagnetization temperature is about from 90° C. to 220° C. Therefore, the permanent magnet can be used without causing thermal demagnetization by setting the air gap Ga to be not smaller than 5 mm.

Figure 10:
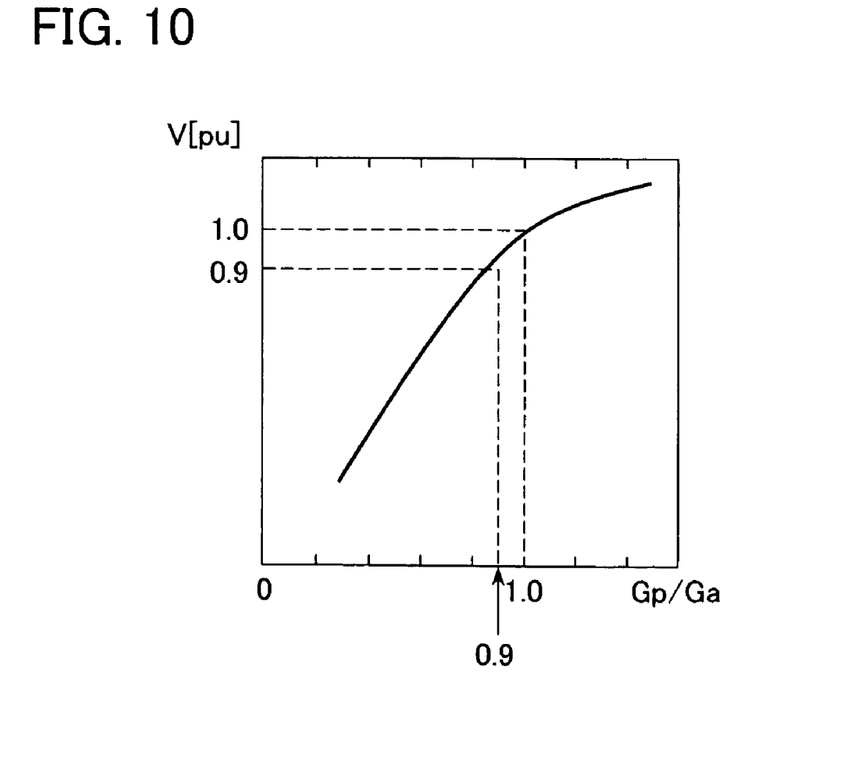
FIG. 10 is a graph showing the relationship between a ratio of the distance from a pole shoe to a rotor shaft to an air gap and an induced voltage.

FIG. 10 shows an analysis result representing the relationship between Gp/Ga and an induced voltage V of the sub-exciter. As will be seen from FIG. 10, when Gp/Ga is smaller than 0.9, the induced voltage V is reduced due to a leakage of magnetic flux from the pole shoe to the rotating shaft. By setting Gp/Ga to be not smaller than 0.9, a reduction of the induced voltage V can be avoided. Also, FIG. 11 shows an analysis result representing the relationship between Gm/Ga and an induced voltage V of the sub-exciter. As will be seen from FIG. 11, by setting the magnet thickness so as to satisfy the relationship of $0.9 < Gm/Ga$, a reduction of the induced voltage V can be avoided without forming a magnetic gap around the permanent magnet.

FIG. 8 is a sectional view of the magnetic pole of the sub-exciter provided in the turbogenerator of the present invention, the view being taken along the radial direction. The pole shoe 12 has a longer axial length than the permanent magnet 13, and bolt holes are formed in portions of the pole shoe 12 axially extending with respect to the permanent magnet 13. The pole shoe 12 is fixed in place by fastening nonmagnetic bolts 15 into the bolt holes. By forming the bolt fastening holes at positions located in the portions of the pole shoe 12 axially extending with respect to the permanent magnet 13, the pole shoe 12 can be mounted in place by the bolts with no need of forming holes in the permanent magnet without impeding main magnetic flux in the pole shoe 12. In addition, by using nonmagnetic bolts, it is possible to prevent establishment of a short-circuiting path of magnetic flux from the pole shoe 12 to the rotating shaft 1.

Conceivable practical forms of the present invention are as follows:

(1) A turbogenerator comprises a rotor over which a field winding is disposed, a coupling co-cut from a rotor shaft, an AC exciter for supplying a DC current to the field winding through a rotary rectifier, and a sub-exciter including a permanent magnet as a field generator and supplying a DC current to a field winding of the AC exciter through an auto voltage regulator having the rectifying function. The AC exciter and the sub-exciter are disposed over the rotor shaft. The rotor is rotated through engagement between a steam turbine or a gas turbine, serving as a prime mover, and the coupling. The sub-exciter is mounted in a position on the side nearer to the turbine than a stator of the turbogenerator.

(2) In the turbogenerator of (1), the sub-exciter is disposed between the coupling and a rotor bearing located on the side nearer to the turbine.

(3) In the turbogenerator of (1) or (2), a stator of the sub-exciter is capable of being split in the circumferential direction, and the stator of the sub-exciter has an inner diameter smaller than an outer diameter of the coupling.

(4) In the turbogenerator of (1) or (2), an armature winding of the sub-exciter is wound in a lumped manner.

(5) In the turbogenerator of (1) or (2), the permanent magnet serving as a field generator for the sub-exciter is a rare earth magnet.

(6) In the turbogenerator of (1) or (2), the permanent magnet of the sub-exciter is directly mounted over the rotor shaft of the turbogenerator.

(7) In the turbogenerator of (6), the permanent magnet of the sub-exciter is mounted between a pole shoe and the rotor shaft of the turbogenerator.

(8) In the turbogenerator of (6), the permanent magnet of the sub-exciter is a magnetized permanent magnet.

(9) In the turbogenerator of (6), the permanent magnet of the sub-exciter is covered with a cover made of a nonmagnetic material.

(10) In the turbogenerator of (7), the pole shoe of the sub-exciter is mounted in place by fastening nonmagnetic bolts.

(11) In the turbogenerator of (10), the pole shoe of the sub-exciter has portions extending in excess of an axial length of the permanent magnet, and bolt holes are formed in the extending portions of the pole shoe.

(12) In the turbogenerator of (7), a minimum gap between the stator of the sub-exciter and the rotor is not smaller than 5 mm.

(13) In the turbogenerator of (7), assuming that a minimum gap between the stator of the sub-exciter and the rotor is Ga (mm) and a distance between the pole shoe and the rotor shaft is Gp (mm), the relationship of 0.9<Gp/Ga is satisfied.

(14) In the turbogenerator of (7), assuming that a minimum gap between the stator of the sub-exciter and the rotor is Ga (mm) and a thickness of the permanent magnet is Gm (mm), the relationship of 0.9<Gm/Ga is satisfied.

What is claimed is:

1. A turbogenerator comprising:
   a stator having an armature winding;
   a rotor having a field winding;
   a coupling monolithically formed with a shaft of said rotor;
   a rotary rectifier;
   an AC exciter for supplying a DC current to said field winding through said rotary rectifier; a rotor bearing arrangement disposed at both sides of said shaft; and
   a sub-exciter having a permanent magnet as a field generator, supplying a DC current to a field winding of said AC exciter, being arranged between a rotor bearing and said coupling at one side of said shaft, a stator of said sub-exciter being split in the circumferential direction, and said AC exciter arranged at a side of said stator other than the same side as that of said sub-exciter,
   wherein said stator, said rotor, said coupling, said rotary rectifier, said AC exciter, and said sub-exciter are arranged over said shaft of said rotor, and
   a pedestal portion for mounting the sub-exciter to the shaft of the rotor, the shaft of the rotor, the coupling and the pedestal portion are monolithically formed of a unitary piece of material.

2. The turbogenerator according to claim 1, wherein the stator of said sub-exciter has an inner diameter smaller than an outer diameter of said coupling.

3. A turbogenerator according to claim 1,
   wherein the permanent magnet of said sub-exciter is disposed between a pole shoe and a rotating shaft of said rotor.

4. The turbogenerator according to claim 3, wherein said pole shoe has portions extending longer than an axial length of said permanent magnet, bolt holes are formed in the extending portions of said pole shoe, and said pole shoe is fixed to the rotating shaft of said rotor by bolts fastened into said bolt holes.

5. The turbogenerator according to claim 3, wherein a minimum gap between a stator of said generator for alternating-current excitation and said rotor is not smaller than 5 mm.

6. The turbogenerator according to claim 3, wherein assuming that a minimum gap between a stator of said generator for alternating-current excitation and said rotor is Ga and a thickness of said permanent magnet is Gm, the relationship of 0.9<Gm/Ga is satisfied.

7. The turbogenerator according to claim 1, wherein a portion of said rotor in which said permanent magnet of said sub-exciter is disposed has an outer diameter larger than an outer diameter of the other portion of said rotor.

* * * * *